(12) United States Patent
Chen

(10) Patent No.: US 11,105,683 B2
(45) Date of Patent: Aug. 31, 2021

(54) INFRARED THERMOMETER CAPABLE OF SWITCHING FOREHEAD TEMPERATURE MEASUREMENT MODE AND EAR TEMPERATURE MEASUREMENT MODE AND SWITCHING METHOD

(71) Applicant: Hetaida Technology Co., Ltd., Dongguan (CN)

(72) Inventor: Zhenguang Chen, Dongguan (CN)

(73) Assignee: HETAIDA TECHNOLOGY CO., LTD., Guangdong (CN)

( * ) Notice: Subject to any disclaimer, the term of this patent is extended or adjusted under 35 U.S.C. 154(b) by 377 days.

(21) Appl. No.: 16/283,831

(22) Filed: Feb. 25, 2019

(65) Prior Publication Data
US 2020/0271525 A1   Aug. 27, 2020

(51) Int. Cl.
*G01J 5/00* (2006.01)
*G01J 5/02* (2006.01)
*G01J 5/24* (2006.01)

(52) U.S. Cl.
CPC ............. *G01J 5/021* (2013.01); *G01J 5/0011* (2013.01); *G01J 5/0025* (2013.01); *G01J 5/24* (2013.01)

(58) Field of Classification Search
CPC .... G01J 5/02; G01J 5/021; G01J 5/049; G01J 5/0011; A61B 5/6817; A61B 2562/0271; A61B 5/0086; A61B 2562/18; A61B 2562/247; G01K 13/20; G01K 13/223
See application file for complete search history.

(56) References Cited

U.S. PATENT DOCUMENTS

| | | | | |
|---|---|---|---|---|
| 4,457,633 A | * | 7/1984 | Andrews | G01K 7/16 374/209 |
| 7,651,265 B2 | * | 1/2010 | Yang | G01J 5/025 374/121 |
| 9,055,924 B2 | * | 6/2015 | Roth | G01J 5/0025 |
| 10,801,894 B2 | * | 10/2020 | Lin | G01J 5/049 |
| 2006/0239332 A1 | * | 10/2006 | Harr | G01J 5/06 374/208 |
| 2015/0198489 A1 | * | 7/2015 | Kinsley | A61B 5/01 600/474 |
| 2021/0045638 A1 | * | 2/2021 | McDuffie | G01K 7/00 |

* cited by examiner

*Primary Examiner* — Gail Kaplan Verbitsky
(74) *Attorney, Agent, or Firm* — Leong C. Lei

(57) ABSTRACT

An infrared thermometer capable of switching a forehead temperature measurement mode and an ear temperature measurement mode and a switching method are disclosed. The infrared thermometer includes an infrared thermometer body and a forehead temperature measurement cover. The infrared thermometer body has a measuring probe and a printed circuit board. The printed circuit board is connected with a first electrical contact. The forehead temperature measurement cover has a thermistor and a second electrical contact. The forehead temperature measurement cover is detachably connected to the infrared thermometer body to selectively cover or expose the measuring probe for switching the forehead temperature measurement mode and the ear temperature measurement mode.

6 Claims, 3 Drawing Sheets

INFRARED THERMOMETER CAPABLE OF SWITCHING FOREHEAD TEMPERATURE MEASUREMENT MODE AND EAR TEMPERATURE MEASUREMENT MODE AND SWITCHING METHOD

BACKGROUND OF THE INVENTION

1. Field of the Invention

The present invention relates to a device for measuring body temperature, and more particularly to an infrared thermometer capable of switching a forehead temperature measurement mode and an ear temperature measurement mode and a switching method.

2. Description of the Prior Art

An infrared thermometer that can switch a forehead temperature measurement mode and an ear temperature measurement mode combines an infrared ear thermometer and an infrared forehead thermometer. In the prior art, there are two ways for switching the forehead temperature measurement mode and the ear temperature measurement mode. One is provided with a switch. The forehead temperature measurement mode and the ear temperature measurement mode are switched manually through the switch. The other is to determine whether there is a cover by identification. When the infrared thermometer is connected with the cover, the forehead temperature measurement mode is performed. When the infrared thermometer is not connected with the cover, the ear temperature measurement mode is performed. There are some deficiencies in the above ways. For example, the switching operation is troublesome. The way to determine the existence of the cover relies on a relatively complicated structural design for a mechanical connection, which is troublesome in production. It is prone to have problems, such as unreliable mechanical contact.

In addition, the forehead temperature measurement is affected by the ambient environment greatly. Clinically, there is an error in the measured forehead temperature value.

Accordingly, the inventor of the present invention has devoted himself based on his many years of practical experiences to solve these problems.

SUMMARY OF THE INVENTION

In view of the shortcomings of the prior art, the primary object of the present invention is to provide an infrared thermometer capable of switching a forehead temperature measurement mode and an ear temperature measurement mode and a switching method. The switching control is simple and convenient, and the accuracy of the forehead temperature measurement is improved effectively.

In order to achieve the above object, the present invention adopts the following technical solutions:

According to one aspect of the present invention, an infrared thermometer capable of switching a forehead temperature measurement mode and an ear temperature measurement mode is provided. The infrared thermometer comprises an infrared thermometer body and a forehead temperature measurement cover. One end of the infrared thermometer body has a measuring probe. The infrared thermometer body includes a printed circuit board therein. The measuring probe is connected to the printed circuit board. The printed circuit board is connected with a first electrical contact. The forehead temperature measurement cover has a thermistor and a second electrical contact connected to the thermistor. The forehead temperature measurement cover is detachably connected to the infrared thermometer body to selectively cover or expose the measuring probe for switching the forehead temperature measurement mode and the ear temperature measurement mode. When the forehead temperature measurement cover is connected to the infrared thermometer body, the second electrical contact and the first electrical contact form an electrical connection so that the thermistor is connected to the printed circuit board.

Preferably, one of the infrared thermometer body and the forehead temperature measurement cover has an engaging protrusion, and the other has an engaging recess. Through the engaging protrusion fitted to the engaging recess, the forehead temperature measurement cover and the infrared thermometer body are connected together and positioned.

Preferably, the first electrical contact and the second electrical contact are disposed on the engaging protrusion and the engaging recess, respectively. The electrical connection between the first electrical contact and the second electrical contact is realized while the infrared thermometer body and the forehead temperature measurement cover are positioned mechanically.

Preferably, the infrared thermometer body is provided with an annular raised platform corresponding to a rear end of the measuring probe. The infrared thermometer body has an annular groove around an outer circumference of the annular raised platform. The engaging protrusion is exposed in the annular groove. The engaging recess is formed on an inner wall of the forehead temperature measurement cover. The forehead temperature measurement cover is fitted to the annular groove.

According to another aspect of the present invention, a method for switching a forehead temperature measurement mode and an ear temperature measurement mode is provided. The method is based on the aforesaid infrared thermometer. When the forehead temperature measurement cover is connected to the infrared thermometer body, the second electrical contact and the first electrical contact form the electrical connection so that the thermistor is connected to the printed circuit board, and the printed circuit board determines that the forehead temperature measurement mode is performed to obtain a forehead temperature value; and the printed circuit board acquires a resistance value of the thermistor to calculate and obtain an ambient temperature and compensates the forehead temperature value measured by the infrared thermometer body by using the ambient temperature to obtain a calibrated forehead temperature value. When the forehead temperature measurement cover is not connected to the infrared thermometer body, the measuring probe is exposed, the printed circuit board is not connected with the thermistor, and the printed circuit board determines that the ear temperature measurement mode is performed.

Preferably, the forehead temperature measurement cover is connected to the infrared thermometer body in a pluggable manner. When the forehead temperature measurement cover and the infrared thermometer body are connected mechanically, the first electrical contact and the second electrical contact form the electrical connection.

Compared with the prior art, the present invention has obvious advantages and beneficial effects. Specifically, it can be known from the above technical solutions. The forehead temperature measurement cover is provided with the thermistor. The thermistor is used as the detecting component for switching the forehead temperature measurement mode and the ear temperature measurement mode. Besides, the thermistor is used as the component for detecting the ambient temperature. The ambient temperature is fed back to compensate the forehead temperature value measured by the infrared thermometer body, thereby obtaining the calibrated forehead temperature value and improving the accuracy of the forehead temperature measurement.

Embodiments of the present invention will now be described, by way of example only, with reference to the accompanying drawings.

DETAILED DESCRIPTION OF THE PREFERRED EMBODIMENTS

Figure 1:
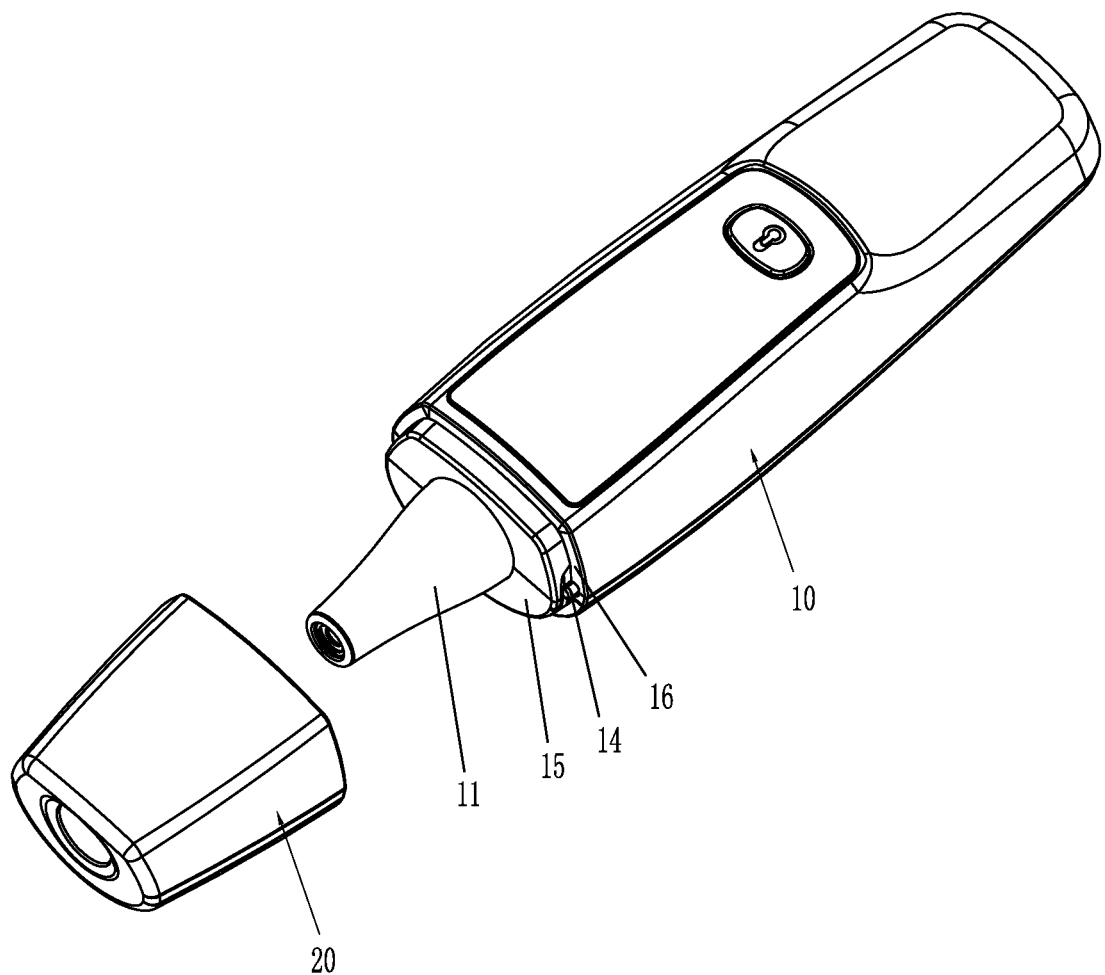
FIG. 1 is an exploded view in accordance with an embodiment of the present invention.
Figure 2:
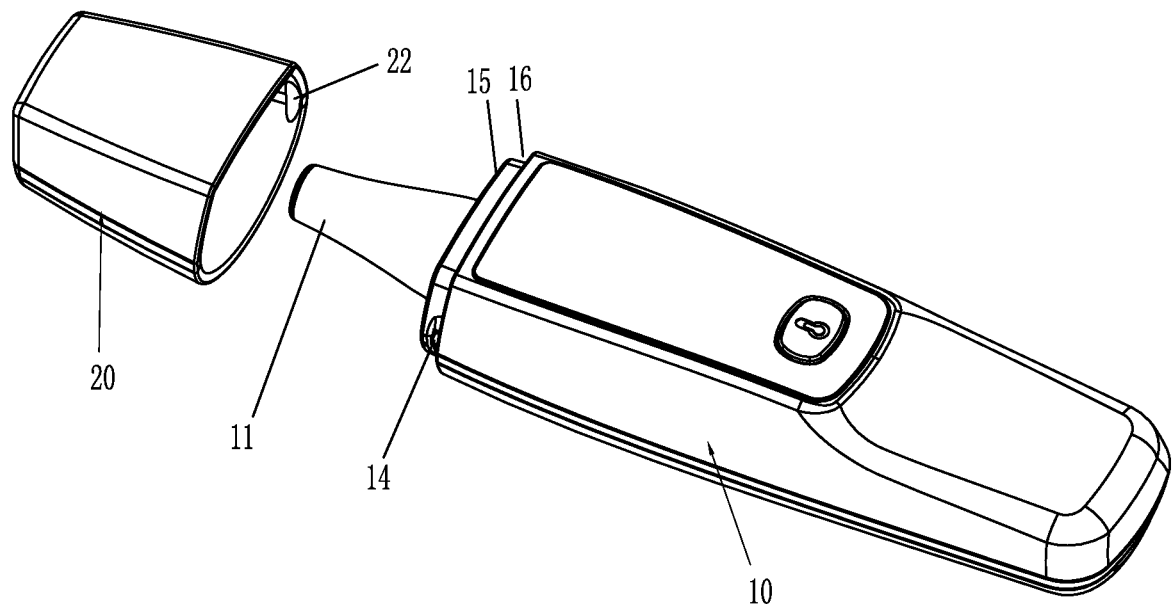
FIG. 2 is another exploded view in accordance with an embodiment of the present invention.
Figure 3:
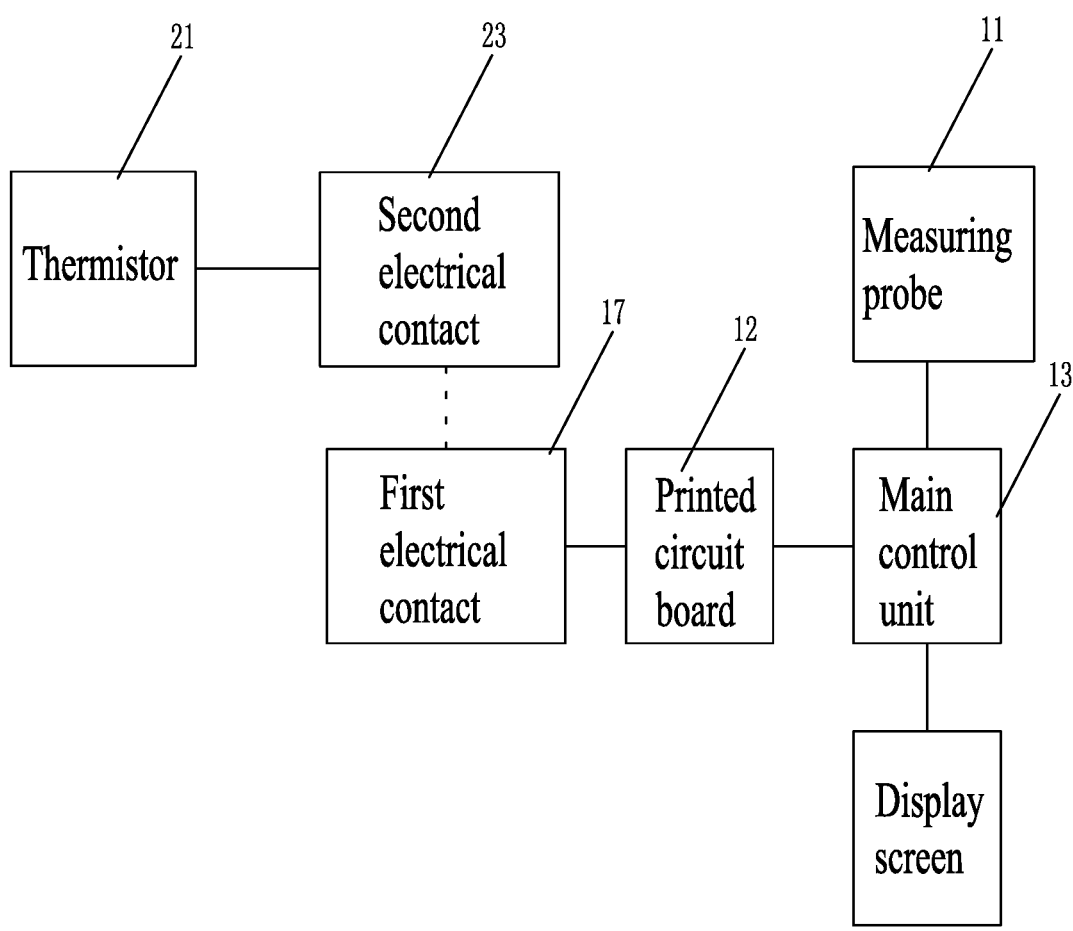
FIG. 3 is a block diagram showing a circuit connection in accordance with an embodiment of the present invention.

Referring to FIG. 1 to FIG. 3, there is shown a specific structure of an embodiment of the present invention.

An infrared thermometer capable of switching a forehead temperature measurement mode and an ear temperature measurement mode comprises an infrared thermometer body 10 and a forehead temperature measurement cover 20. The infrared thermometer body 10 is provided with a power switch, a display screen, and the like.

One end of the infrared thermometer body 10 has a measuring probe 11. The infrared thermometer body 10 includes a printed circuit board 12 therein. The measuring probe 11 is connected to the printed circuit board 12. The printed circuit board 12 is connected with a first electrical contact 17.

The forehead temperature measurement cover 20 has a thermistor 21 and a second electrical contact 23 connected to the thermistor 21.

The forehead temperature measurement cover 20 is detachably connected to the infrared thermometer body 10 to selectively cover or expose the measuring probe 11 for switching the forehead temperature measurement mode and the ear temperature measurement mode. When the forehead temperature measurement cover 20 is connected to the infrared thermometer body 10, the second electrical contact 23 and the first electrical contact 17 form an electrical connection so that the thermistor 21 is connected to the printed circuit board 12.

When the forehead temperature measurement cover 20 is connected to the infrared thermometer body 10, the second electrical contact 23 and the first electrical contact 17 form the electrical connection so that the thermistor 21 is connected to the printed circuit board 12, and the printed circuit board 12 determines that the forehead temperature measurement mode is performed to obtain a forehead temperature value; and the printed circuit board 12 acquires the resistance value of the thermistor 21 to calculate and obtain the ambient temperature and compensates the forehead temperature value measured by the infrared thermometer body 10 by using the ambient temperature to obtain a calibrated forehead temperature value.

When the forehead temperature measurement cover 20 is not connected to the infrared thermometer body 10, the measuring probe 11 is exposed, the printed circuit board 12 is not connected with the thermistor 21, and the printed circuit board 12 determines that the ear temperature measurement mode is performed.

Therefore, in this embodiment, the forehead temperature measurement mode or the ear temperature measurement mode is determined by whether the thermistor 21 is connected to the printed circuit board 12. The printed circuit board 12 is connected with a main control unit 13 for switching the corresponding forehead temperature measurement mode and the ear temperature measurement mode automatically. There is no need to control the switch manually, without relying on a complex mechanical structure. The present invention improves the convenience and reliability of switching effectively.

Generally, the forehead temperature measurement cover 20 is connected to the infrared thermometer body 10 in a pluggable manner. The mechanical connection of the forehead temperature measurement cover 20 and the infrared thermometer body 10 and the electrical connection of the first and second electrical contacts 17, 23 are completed by one insertion operation.

The pluggable structure between the forehead temperature measurement cover 20 and the infrared thermometer body 10 may be implemented in different manners. In this embodiment, a feasible structure is provided for explanation. One of the infrared thermometer body 10 and the forehead temperature measurement cover 20 has an engaging protrusion 14, and the other has an engaging recess 22. Through the engaging protrusion 14 fitted to the engaging recess 22, the forehead temperature measurement cover 20 and the infrared thermometer body 10 are connected together and positioned. The first electrical contact 17 and the second electrical contact 23 are disposed on the engaging protrusion 14 and the engaging recess 22, respectively. The electrical connection between the first electrical contact 17 and the second electrical contact 23 is realized while the infrared thermometer body 10 and the forehead temperature measurement cover 20 are positioned mechanically. The first electrical contact and the second electrical contact may be disposed at other positions, not limited to the positions of the engaging protrusion 14 and the engaging recess 22. The electrical contacts may be a resilient boss to provide better and reliable contact between the first electrical contact and the second electrical contact. Furthermore, the infrared thermometer body 10 is provided with an annular raised platform 15 corresponding to the rear end of the measuring probe 11. The infrared thermometer body 10 has an annular groove 16 around the outer circumference of the annular raised platform 15. The engaging protrusion 14 is exposed in the annular groove 16. The engaging recess 22 is formed on the inner wall of the forehead temperature measurement cover 20. The forehead temperature measurement cover 20 is fitted to the annular groove 16.

The feature of the present invention is described below. The forehead temperature measurement cover is provided with the thermistor. The thermistor is used as the detecting component for switching the forehead temperature measurement mode and the ear temperature measurement mode. Besides, the thermistor is used as the component for detecting the ambient temperature. The ambient temperature is fed back to compensate the forehead temperature value measured by the infrared thermometer body, thereby obtaining the calibrated forehead temperature value and improving the accuracy of the forehead temperature measurement.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An infrared thermometer capable of switching a forehead temperature measurement mode and an ear temperature measurement mode, comprising an infrared thermometer body and a forehead temperature measurement cover;
one end of the infrared thermometer body having a measuring probe, the infrared thermometer body including a printed circuit board therein, the measuring probe being connected to the printed circuit board, the printed circuit board being connected with a first electrical contact;
the forehead temperature measurement cover having a thermistor and a second electrical contact connected to the thermistor;
the forehead temperature measurement cover being detachably connected to the infrared thermometer body to selectively cover or expose the measuring probe for switching the forehead temperature measurement mode and the ear temperature measurement mode; wherein when the forehead temperature measurement cover is connected to the infrared thermometer body, the second electrical contact and the first electrical contact form an electrical connection so that the thermistor is connected to the printed circuit board.

2. The infrared thermometer as claimed in claim 1, wherein one of the infrared thermometer body and the forehead temperature measurement cover has an engaging protrusion, and the other has an engaging recess;
through the engaging protrusion fitted to the engaging recess, the forehead temperature measurement cover and the infrared thermometer body are connected together and positioned.

3. The infrared thermometer as claimed in claim 2, wherein the first electrical contact and the second electrical contact are disposed on the engaging protrusion and the engaging recess respectively, the electrical connection between the first electrical contact and the second electrical contact is realized while the infrared thermometer body and the forehead temperature measurement cover are positioned mechanically.

4. The infrared thermometer as claimed in claim 3, wherein the infrared thermometer body is provided with an annular raised platform corresponding to a rear end of the measuring probe, the infrared thermometer body has an annular groove around an outer circumference of the annular raised platform; the engaging protrusion is exposed in the annular groove, the engaging recess is formed on an inner wall of the forehead temperature measurement cover, and the forehead temperature measurement cover is fitted to the annular groove.

5. A method for switching a forehead temperature measurement mode and an ear temperature measurement mode, based on the infrared thermometer as claimed in claim 1, wherein
when the forehead temperature measurement cover is connected to the infrared thermometer body, the second electrical contact and the first electrical contact form the electrical connection so that the thermistor is connected to the printed circuit board, and the printed circuit board determines that the forehead temperature measurement mode is performed to obtain a forehead temperature value; and the printed circuit board acquires a resistance value of the thermistor to calculate and obtain an ambient temperature and compensates the forehead temperature value measured by the infrared thermometer body by using the ambient temperature to obtain a calibrated forehead temperature value;
when the forehead temperature measurement cover is not connected to the infrared thermometer body, the measuring probe is exposed, the printed circuit board is not connected with the thermistor, and the printed circuit board determines that the ear temperature measurement mode is performed.

6. The method as claimed in claim 5, wherein the forehead temperature measurement cover is connected to the infrared thermometer body in a pluggable manner, when the forehead temperature measurement cover and the infrared thermometer body are connected mechanically, the first electrical contact and the second electrical contact form the electrical connection.

* * * * *